Aug. 19, 1924.
C. CRETORS
1,505,315
GRADER FOR POPPED CORN
Filed Jan. 22, 1923
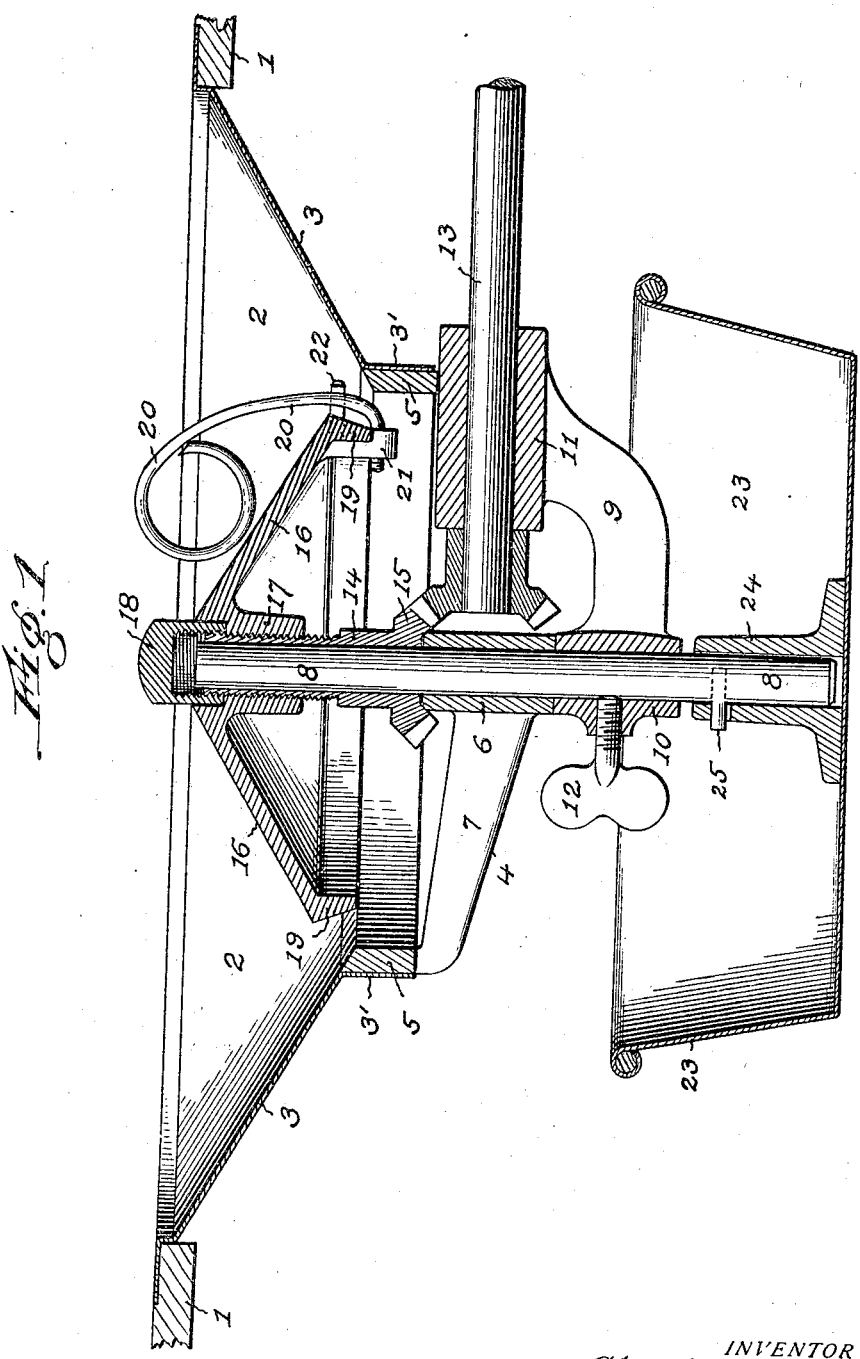
INVENTOR:
Charles Cretors.
BY
Robert Burns
ATTORNEY.

Patented Aug. 19, 1924.

1,505,315

UNITED STATES PATENT OFFICE.

CHARLES CRETORS, OF CHICAGO, ILLINOIS.

GRADER FOR POPPED CORN.

Application filed January 22, 1923. Serial No. 614,182.

*To all whom it may concern:*

Be it known that I, CHARLES CRETORS, a citizen of the United States of America, residing at Chicago, in the county of Cook and State of Illinois, have invented a certain new and useful Improvement in Graders for Popped Corn, of which the following is a specification.

This invention relates to a grading attachment for corn popping and vending machines for the removal of the grains of unpopped corn, etc. from the mass of popped corn after its discharge from the popping pan, and the present improvement has for its object:

To provide a simple and substantial structural formation and combination of parts, whereby the unpopped grains of corn as well as the fragmentary portions of the popped corn are separated in a very effective manner from the perfectly popped merchantable grains of corn, with little of any injury by abrasion to such merchantable portion, in the grading operation, all as will hereinafter more fully appear.

In the accompanying drawing:—

Fig. 1, is a detail central vertical section of an apparatus embodying the preferred form of the invention.

In the manufacture of a high grade merchantable pop corn, the main requisite is that the fully popped grains of corn be entirely free from all unpopped grains, as well as the smaller particles of popped corn and any other impurities in the product as it comes from the popping pan. Heretofore, the difficulty with the different types of grading mechanisms, has been that a large percentage of the fully popped corn, are broken down in the grading operation, and with a view to prevent, in a great measure, such waste, the main object of the present improvement lies and to such end consists in a construction as follows:

Referring to the drawing:—1, designates a portion of an intermediate horizontal partition or wall of the usual glass walled housing in which the corn popping pan is enclosed, and from which pan the popped corn is dumped onto the partition 1 as usual in this type of apparatus.

2, designates a circular pit formed centrally in the partition 1 aforesaid, and having a downwardly inclined conical form ending at its lower end in a circular orifice, and preferably by a sheet metal wall or insert 3 of the proper shape and having a downturned annular flange 3′ around said opening for supporting engagement with a skeleton frame or spider hereinafter described.

The circular pit 2 in the present construction is formed into a shallow pit of an annular shape and triangular in cross section, by a central conical head or deflector 16 hereinafter described in detail, it having been found by extended practical experiment that such shallow form of the pit 2 is best adapted to function in an efficient and economical grading of the popped corn as it comes from the popping pan of the apparatus.

4, designates the skeleton frame or spider above referred to, having an annular rim 5 for attachment to the flange 3′ of the pit wall 3 aforesaid, and a central hub portion 6 connected to said rim portion by one or more radial arms 7, as shown.

8, designates a stationary vertical post or arbor arranged centrally of the pit 2, and fitted to the vertical bore of the hub portion 6 of the frame or spider 4, to be held in proper central relation in the structure.

9, designates an angular bracket having a vertical hub 10 and a horizontal hub 11, with the vertical hub 10 arranged to encircle the post or arbor 8 and secured thereon by a set screw 12, while the horizontal hub 11 affords a bearing for a horizontal driving shaft 13 operatively connected to the power source of the apparatus.

14, designates a sleeve revolubly mounted on the upper portion of the post or arbor 8 and having bearing at its lower end upon the hub 10 aforesaid. At its lower end the sleeve 14 has operative engagement with the driving shaft 13 by a pair of bevel gears 15, while its upper portion is formed with peripheral screw threads for the attachment of parts as follows:

16, designates a conical deflector head, having a central screw threaded hub 17 for adjustable engagement with the screw threaded upper end of the sleeve 14 aforesaid. The deflector head 16 is locked to its adjustment by a cap nut 18 screwed upon the upper end of the sleeve 14 as shown. At its base, the deflector head 16 is of a less diameter than the bottom orifice of the pit 2 aforesaid, so as to leave a narrow annular discharge throat between the two parts, which is capable of enlargement and contraction by a vertical adjustment of the deflector head 16 with relation to the bottom orifice of the pit 2.

19, designates an annular depending skirt or flange on the lower end of the deflector head 16, preferably of the tapering form shown, and adapted to provide in connection with the beveled upper end of the rim 5 aforesaid, a discharge throat capable of accurate regulation in the adjustment of parts to effect an enlargement or a contraction of said throat.

20, designates a stirrer finger, preferably formed of rod metal, the lower end of which is attached to the periphery of the flange or skirt 19 aforesaid by depending lug 21 and bracing studs 22 on said skirt. The stirrer finger 20 extends up centrally of the shallow annular pit 2 above described, and centrally of the annular mass of popped corn in said pit, and preferably a distance above the pit and mass of popped corn, with its upper portion bent or looped as shown to aid in a stirring action on the upper layer of said mass. A single stirrer finger 20, so formed and arranged has been found to afford the necessary stirring action in the operation of the present apparatus. In such stirring operation the unpopped grains of corn, etc., are adapted to descend by gravity to and through the annular throat above described, and which is made narrow enough to prevent passage of the properly popped grains of corn.

23, designates a receiving pan for the unpopped grains of corn, etc. passed through the annular throat aforesaid. In the construction shown, said pan is provided with a central tubular socket head 24 adapted to fit the lower end of the aforesaid stationary post or arbor 8, to insure a proper central position of the pan 23 beneath the aforesaid annular outlet throat.

25, designates a lateral stud on the post or arbor 8, adapted for engagement in an open top slot in the socket head 24, to hold the pan 23 from turning movement.

Having thus fully described my invention, what I claim as new and desire to secure by Letters Patent, is:—

1. In a grader, the combination of a horizontal plate provided with a circular pit the wall of which inclines downwardly towards the center and has a central circular opening, a conical deflector head arranged centrally in said pit and forming in connection with said opening a narrow outlet throat and in connection with the pit wall forming a shallow oppositively tapering annular containing cavity for the substance treated, a stirrer finger arranged in said throat and extending up centrally through the annular mass of material, and means for imparting movement to said finger.

2. In a grader, the combination of a horizontal plate provided with a circular pit the wall of which inclines downwardly towards the center and has a central circular opening, a conical deflector head arranged centrally in said pit and forming in connection with said opening a narrow outlet throat and in connection with the pit wall forming a shallow oppositively tapering annular containing cavity for the substance treated, a stirrer finger arranged in said throat and extending up centrally through the annular mass of material, and means for imparting endless circular movement to said finger in said outlet throat.

3. In a grader, the combination of a horizontal plate provided with a circular pit the wall of which inclines downwardly towards the center and has a central circular opening, a conical deflector head arranged centrally and in vertically adjustable manner in said pit and forming in connection with said opening a narrow outlet throat and in connection with the pit wall forming a shallow oppositively tapering annular containing cavity for the substance treated, a stirrer finger arranged in said throat and extending up centrally through the annular mass of material, and means for imparting movement to said finger.

4. In a grader, the combination of a horizontal plate provided with a circular pit the wall of which inclines downwardly towards the center and has a central circular opening, a conical deflector head arranged centrally and in a vertically adjustable manner in said pit and forming in connection with said opening a narrow outlet throat and in connection with the pit wall forming a shallow oppositively tapering annular containing cavity for the substance treated, a stirrer finger arranged in said throat and extending up centrally through the annular mass of material, and means for imparting endless circular movement to said finger in said outlet throat.

5. In a grader, the combination of a horizontal plate provided with a circular pit the wall of which inclines downwardly towards the center and has a central circular opening, a conical deflector head arranged centrally in said pit and forming in connection with said opening a narrow outlet throat and in connection with the pit wall forming a shallow oppositively tapering annular containing cavity for the substance treated, a stirrer finger arranged in said throat and extending up centrally through the annular mass of material, and means for imparting movement to said finger, the conical deflector head having a tapering depending skirt portion.

6. In a grader, the combination of a horizontal plate having a central circular pit formed by a conical sheet metal insert having a downturned flange at its open end, a frame having an annular rim fitting said downturned flange, and having a central hub connected to said rim by a radial arm, a stationary vertical post arranged in said hub, a conical deflector head arranged on the upper end on said post and centrally in the said pit, with its lower end forming in connection with the pit opening a narrow outlet throat and in connection with the pit wall forming a shallow oppositively tapering annular containing cavity for the substance treated, a stirrer finger arranged in said throat and extending up centrally through the annular mass of the material, and means for imparting movement to said finger.

7. In a grader, the combination of a horizontal plate having a central circular pit formed by a conical sheet metal insert having a downturned flange at its open end, a frame having an annular rim fitting said downturned flange and having a central hub connected to said rim by a radial arm, a stationary vertical post arranged in said hub, a sleeve revolubly mounted on said post and having a screw threaded upper end, a conical deflector head screwed upon the upper end of said sleeve, with its lower end forming in connection with the pit opening a narrow outlet throat and in connection with the pit wall forming a shallow oppositively tapering annular containing cavity for the substance treated, a cap nut screwed upon the upper end of the aforesaid sleeve to secure the deflector head in place, means for imparting rotation to said sleeve, and a stirrer finger associated with said sleeve and having movement in said outlet throat and extending up centrally through the annular mass of the material.

Signed at Chicago, Illinois, this 17th day of January, 1923.

CHARLES CRETORS.